US012707002B2

(12) United States Patent
Heard Moss

(10) Patent No.: US 12,707,002 B2
(45) Date of Patent: Aug. 11, 2026

(54) CHARM HOLDER GRIP DEVICE

(71) Applicant: Sharon Heard Moss, Buena Park, CA (US)

(72) Inventor: Sharon Heard Moss, Buena Park, CA (US)

( * ) Notice: Subject to any disclaimer, the term of this patent is extended or adjusted under 35 U.S.C. 154(b) by 220 days.

(21) Appl. No.: 18/778,113

(22) Filed: Jul. 19, 2024

(65) Prior Publication Data

US 2026/0025453 A1 Jan. 22, 2026

(51) Int. Cl.
*H04M 1/04* (2006.01)
*H04B 1/3877* (2015.01)

(52) U.S. Cl.
CPC .................................... *H04M 1/04* (2013.01)

(58) Field of Classification Search
None
See application file for complete search history.

(56) References Cited

U.S. PATENT DOCUMENTS 8,560,031 B2 * 10/2013 Barnett .................. F16M 11/10 455/575.8
8,737,066 B1 * 5/2014 Block ...................... A45F 5/00 224/217
9,787,348 B2 * 10/2017 Srour ................... H04R 1/1033
9,800,703 B2 * 10/2017 Roux .................. H04M 1/0281
9,958,107 B1 5/2018 Hobbs
9,970,589 B2 * 5/2018 Hobbs .................... F16M 13/00
10,200,518 B2 * 2/2019 Richter ..................... A45F 5/00
10,348,352 B2 * 7/2019 Barnett .................. F16M 13/04
10,530,411 B2 * 1/2020 Gehlhausen ............ H04M 1/21
10,694,835 B2 * 6/2020 Peterson ................ A45C 11/00
10,742,251 B2 * 8/2020 Barnett ...................... A45F 5/10
10,750,844 B2 * 8/2020 Peterson ................ A45C 11/00
10,895,345 B2 * 1/2021 Lederer .................. F16M 13/00
10,897,984 B2 * 1/2021 Roth ...................... A45C 11/00
11,039,679 B2 * 6/2021 Jang ....................... A45C 11/00
11,183,880 B2 * 11/2021 Haber ..................... H01F 27/02
11,190,227 B2 * 11/2021 Barnett .................. F16M 11/38
11,274,697 B2 * 3/2022 Srour ....................... F16F 1/428
11,284,525 B2 * 3/2022 Hamilton ................ H04M 1/04
11,484,811 B2 11/2022 Cantoli-Alves
11,564,480 B2 * 1/2023 Ruddy ...................... A45F 5/00
11,641,417 B2 * 5/2023 Cooper .................. F16M 13/00 455/575.1

(Continued)

FOREIGN PATENT DOCUMENTS

WO WO2019136363 7/2019

*Primary Examiner* — Tuan A Tran

(57) ABSTRACT

A charm holder grip device includes an electronic device grip which has an attachment element that engages a personal electronic device. The electronic device grip can be gripped by a user for holding the personal electronic device. The electronic device grip has a cup portion which tapers with respect to the attachment element to facilitate a user to grip the cup portion thereby enabling the user to hold the personal electronic device. A cup is releasably attachable to the cup portion of the electronic device grip to contain a charm of sentimental value to the user. A cap is positionable on top of the cup to retain the charm in the cup. The cap releasably engages the cup portion thereby releasably attaching the cap and the cup to the cup portion. A lens is integrated into the cap thereby enabling the charm to be visible through the lens.

10 Claims, 4 Drawing Sheets

(56) References Cited

U.S. PATENT DOCUMENTS

| | | | | |
|---|---|---|---|---|
| 11,671,527 | B2 * | 6/2023 | Parish, Sr. | H04M 1/04<br>455/575.1 |
| 11,689,237 | B2 * | 6/2023 | Kim | H04M 1/026<br>455/575.1 |
| 11,744,353 | B1 * | 9/2023 | Staten | A45F 5/00<br>294/26 |
| D1,001,793 | S | 10/2023 | Staten | |
| 11,994,251 | B2 * | 5/2024 | Daniels | F16M 11/105 |
| 12,028,472 | B1 * | 7/2024 | Brammer | H04M 1/04 |
| 12,273,478 | B2 * | 4/2025 | Shaw | G06F 1/1656 |
| 12,433,391 | B2 * | 10/2025 | Cornish | A45C 11/00 |
| 12,523,798 | B2 * | 1/2026 | Chavez | A45F 5/10 |
| 12,575,654 | B2 * | 3/2026 | Bohman | A45C 11/182 |
| 2019/0215391 | A1 | 7/2019 | Chiang | |
| 2020/0072275 | A1 * | 3/2020 | Yang | F04B 35/04 |
| 2021/0140580 | A1 | 5/2021 | Nahum | |
| 2022/0166868 | A1 * | 5/2022 | Whitten | F16M 13/00 |
| 2024/0085594 | A1 * | 3/2024 | Chavez | A45F 5/10 |
| 2024/0148131 | A1 * | 5/2024 | Bohman | A45C 11/00 |
| 2025/0357961 | A1 * | 11/2025 | Balderston | H04B 1/3877 |

* cited by examiner

CHARM HOLDER GRIP DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to charm holder devices and more particularly pertains to a new charm holder device for enabling a user to view a charm of sentimental value while holding a personal electronic device. The device includes an electronic device grip that has a disk portion and a cup portion and an adhesive layer bonded to the disk portion which adhesively engages a back wall of a personal electronic device such that the cup portion can be gripped for holding the personal electronic device. The device includes a cup that is positionable in the cup portion which can contain a charm and a cap that is attachable to the cup portion of the electronic device grip for retaining both the cup in the cup portion and retaining the charm in the cup. The device includes a lens integrated into the cap to facilitate the charm to be visible in the cup.

(2) Description of Related Art Including Information Disclosed Under 37 CFR 1.97 and 1.98

The prior art relates to charm holder devices including a variety of expandable socket devices that each at least includes a base, a cap, and a skin extending between the base and the cap and a biasing member surrounded by the skin and an attachment element attached to the base which can engage a personal electronic device. In no instance does the prior art disclose a charm holder grip device that includes an electronic device grip that is attachable to a personal electronic device and a cup that is nestable into the electronic device grip for containing a charm and a cap that is attachable to the cup which has a lens to enable the charm to be visible through the cap.

BRIEF SUMMARY OF THE INVENTION

An embodiment of the disclosure meets the needs presented above by generally comprising an electronic device grip which has an attachment element that engages a personal electronic device. The electronic device grip can be gripped by a user for holding the personal electronic device. The electronic device grip has a cup portion which tapers with respect to the attachment element to facilitate a user to grip the cup portion thereby enabling the user to hold the personal electronic device. A cup is releasably attachable to the cup portion of the electronic device grip to contain a charm of sentimental value to the user. A cap is positionable on top of the cup to retain the charm in the cup. The cap releasably engages the cup portion thereby releasably attaching the cap and the cup to the cup portion. A lens is integrated into the cap thereby enabling the charm to be visible through the lens.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
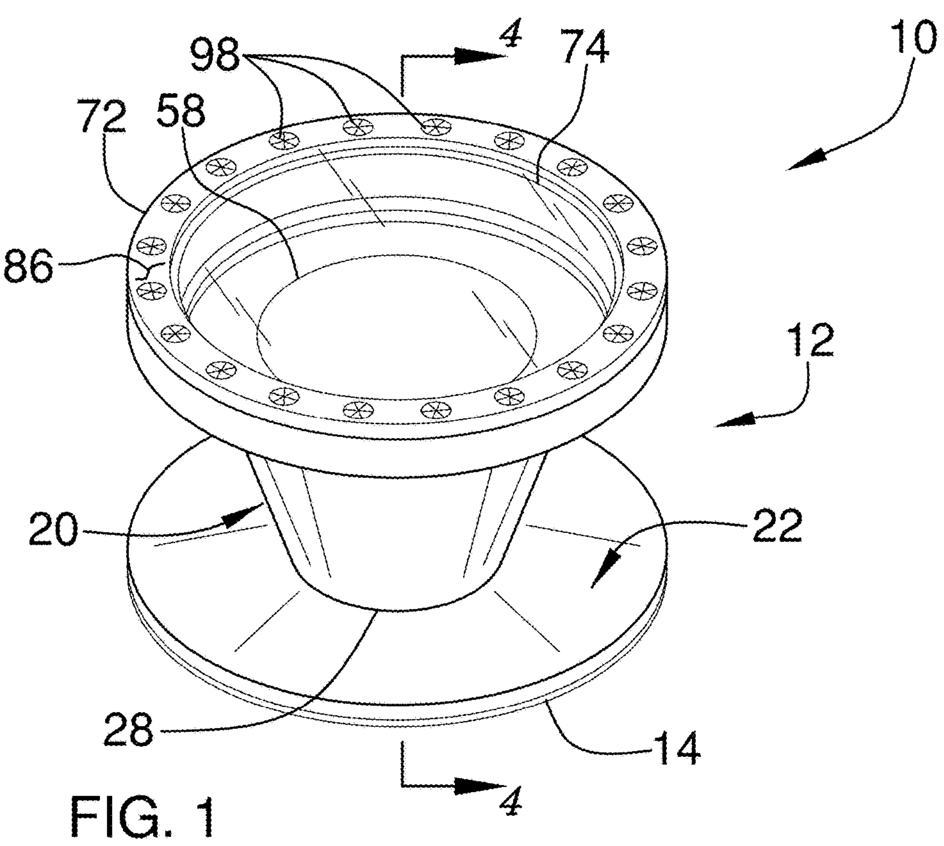
FIG. 1 is a top perspective view of a charm holder grip device according to an embodiment of the disclosure.
Figure 2:
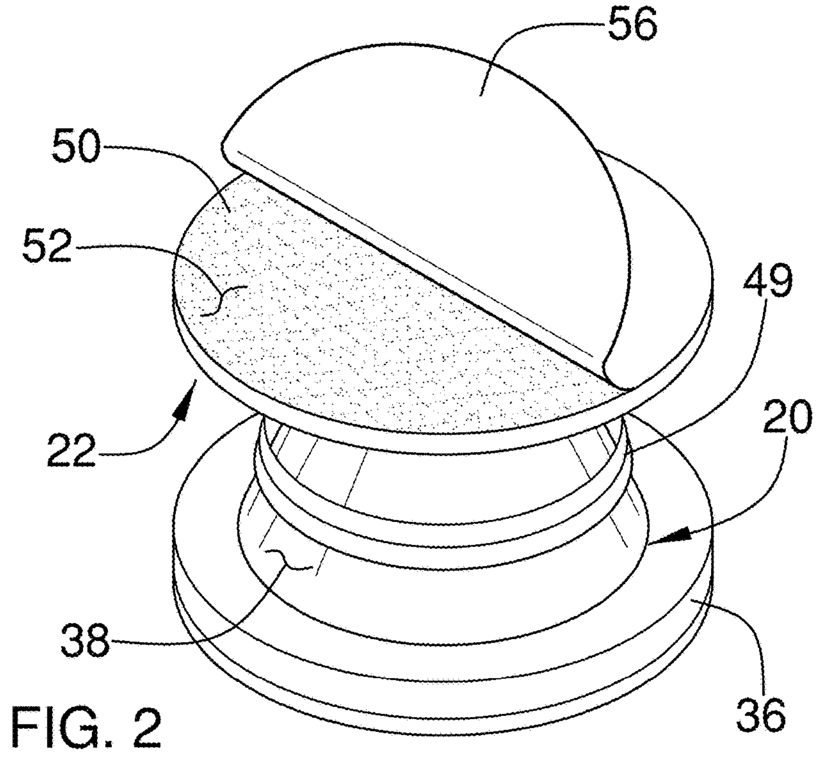
FIG. 2 is a bottom perspective view of an embodiment of the disclosure.
Figure 3:
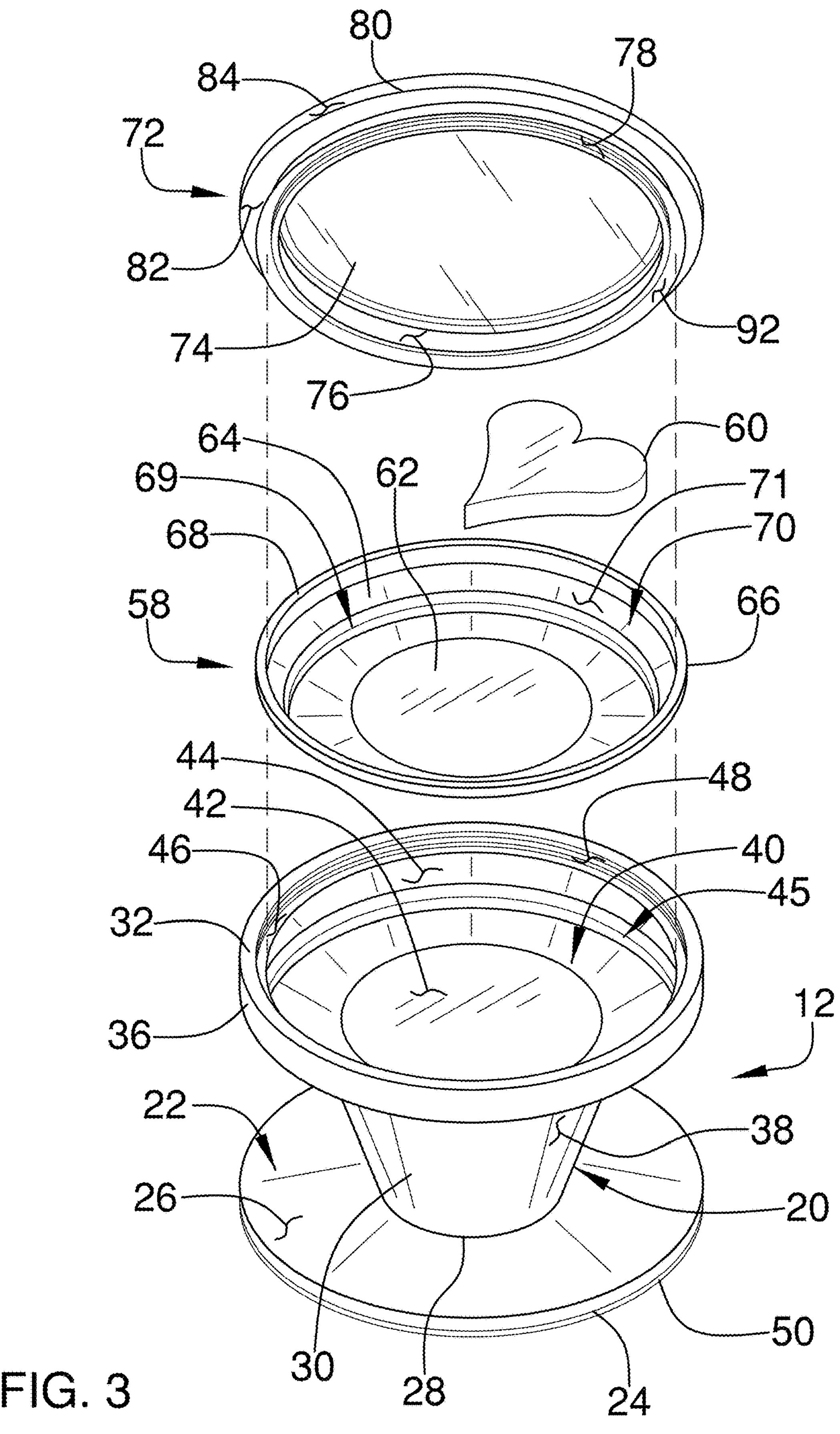
FIG. 3 is an exploded perspective view of an embodiment of the disclosure.
Figure 4:
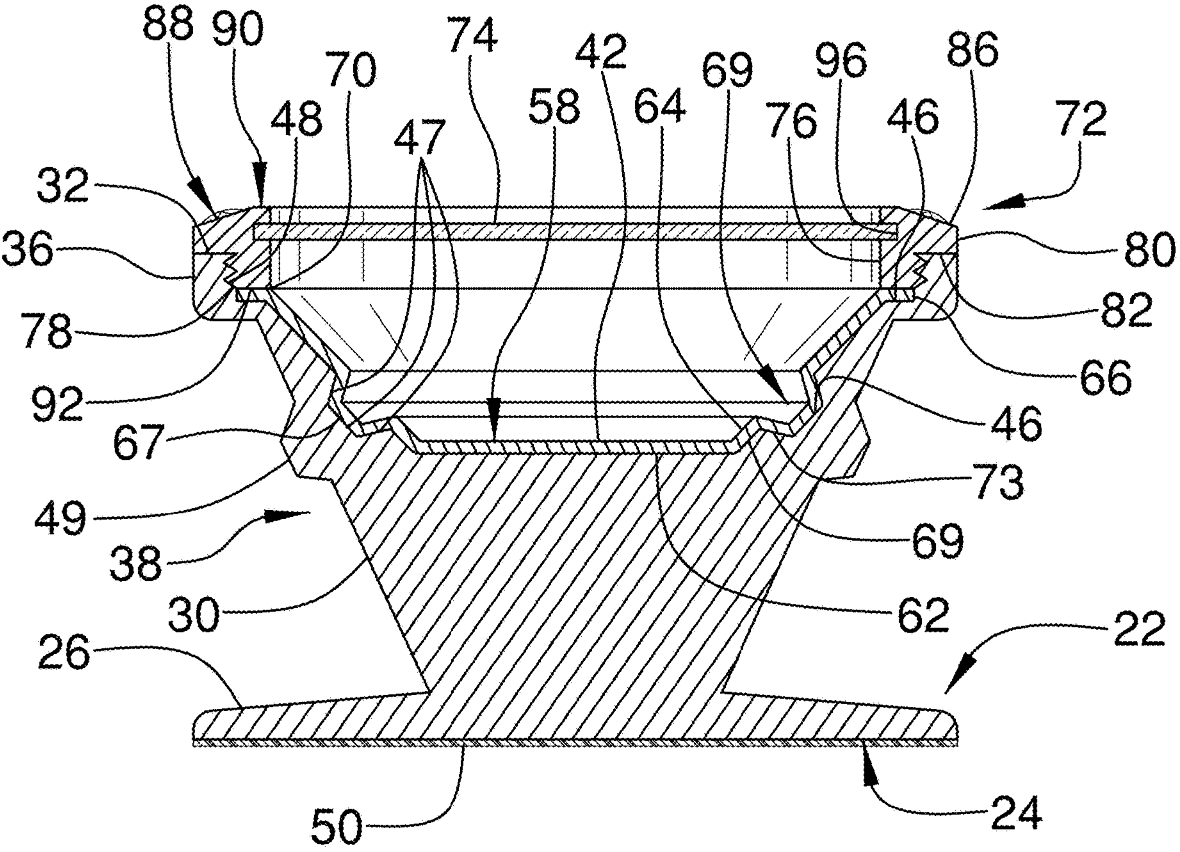
FIG. 4 is a cross sectional view taken along line 4-4 of FIG. 1 of an embodiment of the disclosure.
Figure 5:
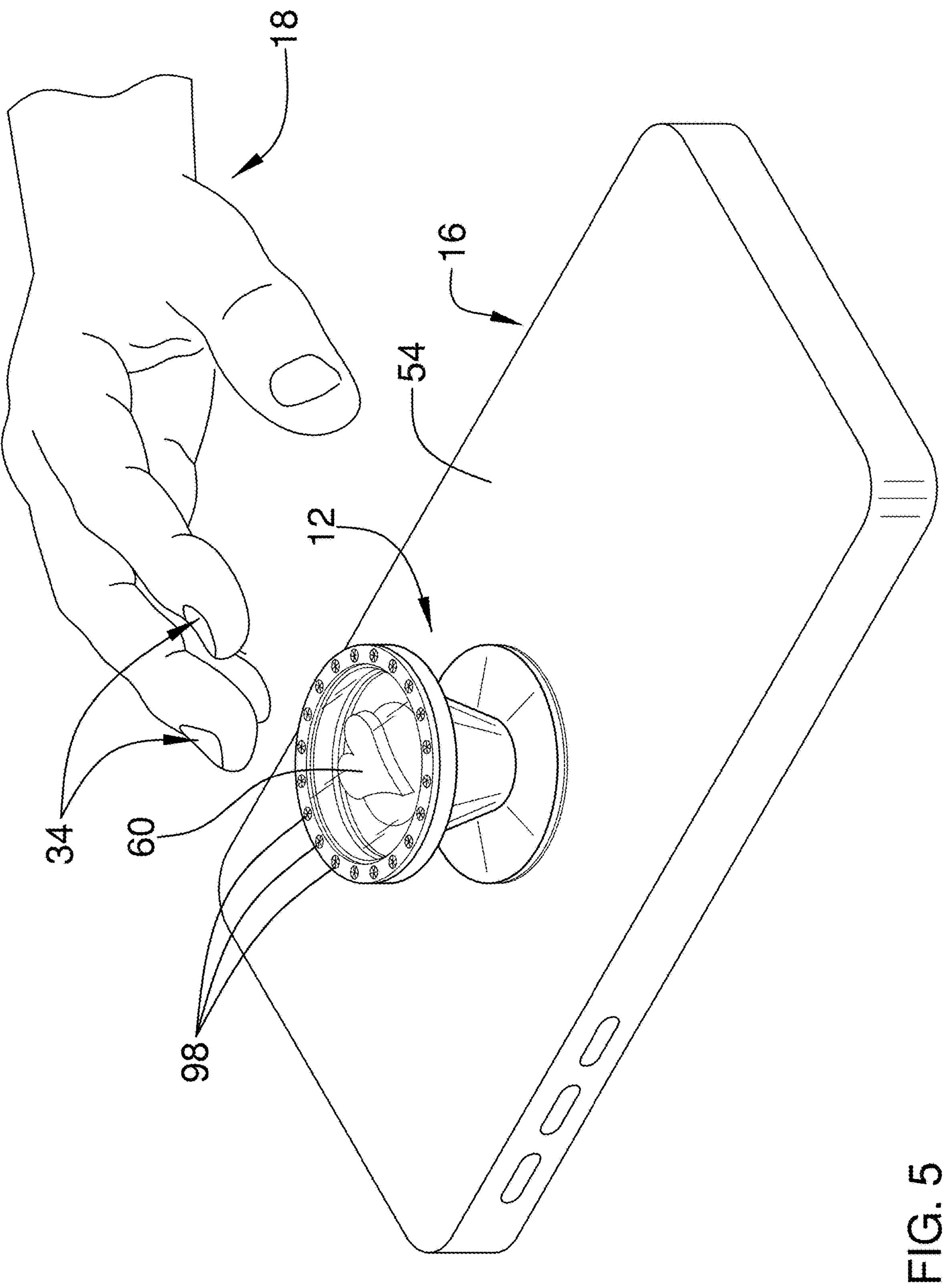
FIG. 5 is a perspective in-use view of an embodiment of the disclosure.

With reference now to the drawings, and in particular to FIGS. 1 through 5 thereof, a new charm holder device embodying the principles and concepts of an embodiment of the disclosure and generally designated by the reference numeral 10 will be described.

As best illustrated in FIGS. 1 through 5, the charm holder grip device 10 generally comprises an electronic device grip 12 that has an attachment element 14 which engages a personal electronic device 16 thereby enabling the electronic device grip 12 to be retained on the personal electronic device 16. In this way the electronic device grip 12 can be gripped by a user 18 for holding the personal electronic device 16. The personal electronic device 16 may be a smart phone or other similar type of hand held electronic device. The electronic device grip 12 has a cup portion 20 which tapers with respect to the attachment element 14. In this way the cup portion 20 enables the user 18 to grip the cup portion 20 thereby enabling the user 18 to hold the personal electronic device 16.

The electronic device grip 12 has a disk portion 22 which has a bottom surface 24 and a top surface 26 and the top surface 26 slopes upwardly with respect to the bottom surface 24 toward a center of the disk portion 22. The cup portion 20 has a bottom end 28 which is attached to the top surface 26 of the disk portion 22 at the center of the disk portion 22. Additionally, the cup portion 20 has an outer wall 30 angling outwardly between the bottom end 28 and a top end 32 of the cup portion 20. In this way the outer wall 30 enables the user 18 to grip the outer wall 30 with their fingers 34. The outer wall 30 has a lip 36 extending laterally away from an outer surface 38 of the outer wall 30 and the lip 36 is aligned with the top end 32. In this way the lip 36 inhibits the user's fingers 34 from sliding upwardly off of the outer wall 30. Additionally, the lip 36 extends around a full circumference of the outer wall 30.

The cup portion 20 has a depression 40 extending downwardly into the top end 32. The depression 40 has a lower bounding surface 42 and an angled bounding surface 44 extending upwardly from and sloping outwardly from the lower bounding surface 42. The depression 40 has an upper bounding surface 46 which is oriented perpendicular to the angled bounding surface 44. Additionally, the depression 40 has a vertical bounding surface 48 extending between the upper bounding surface 46 and the top end 32 of the cup portion 20. The vertical bounding surface 48 is perpendicularly oriented with the upper bounding surface 46 and the lower bounding surface 42 lies on a plane that is oriented parallel to the bottom surface 24 of the disk portion 22. Additionally, the upper bounding surface 46 lies on a plane that is oriented parallel to the lower bounding surface 42 and the vertical bounding surface 48 is threaded.

The depression 40 has a channel 45 which extends into the angled bounding surface 44 of the depression 40 and the channel 45 extends around a full circumference of the angled bounding surface 44. Furthermore, the channel 45 is located between the vertical bounding surface 48 and the lower bounding surface 42. The channel 45 has a plurality of intersecting surfaces 47 which are oriented at obtuse angles with each other such that the channel 45 has a rectilinear profile. The outer wall 30 of the of cup portion 20 has a protrusion 49 which extends outwardly from the outer surface 38 of the outer wall 30 and the protrusion 49 is aligned with and is coextensive with the channel 45 in the angled bounding surface 44 of the depression 40.

An adhesive layer 50 is bonded to the bottom surface 24 of the disk portion 22 having the adhesive layer 50 completely covering the bottom surface 24. Furthermore, the adhesive layer 50 defines the attachment element 14 of the electronic device grip 12. The adhesive layer 50 has an exposed surface 52 with respect to the bottom surface 24 of the disk portion 22 which adhesively engages a back wall 54 of the personal electronic device 16. In this way the electronic device grip 12 is retained on the back wall 54 of the personal electronic device 16. A protective sheet 56 is removably applied to the exposed surface 52 of the adhesive layer 50 having the protective sheet 56 completely covering the adhesive layer 50 thereby inhibiting the adhesive layer 50 from being adhered. The protective sheet 56 is removable from the exposed surface 52 of the adhesive layer 50 prior to adhering the adhesive layer 50 to the back wall 54 of the personal electronic device 16.

A cup 58 is releasably attachable to the cup portion 20 of the electronic device grip 12 to contain a charm 60 which has sentimental value to the user 18. The charm 60 may be a necklace, a ring a keepsake or other type of ornamental charm that has sentimental value to the user 18. The cup 58 has a bottom wall 62 and a perimeter wall 64 extending upwardly from and angling outwardly from the bottom wall 62. The cup 58 has a lip 66 which extends laterally away from an exterior surface 69 of the perimeter wall 64 and the lip 66 on the perimeter wall 64 extends around a full circumference of the perimeter wall 64. Additionally, the lip 66 on the perimeter wall 64 is aligned with a top edge 68 of the perimeter wall 64 and the top edge 68 defines an opening 70 into the cup 58.

The bottom wall 62 lies upon the lower bounding surface 42 of the depression 40 when the cup 58 is placed into the cup portion 20. The perimeter wall 64 rests against the angled bounding surface 44 of the depression 40 when the cup 58 is placed into the cup portion 20. Additionally, the lip 66 on the perimeter wall 64 lies upon the upper bounding surface 46 of the depression 40 when the cup 58 is placed into the cup portion 20. The perimeter wall 64 of the cup 58 has a protrusion 67 which extends outwardly from the exterior surface 69 of the perimeter wall 64 and the perimeter wall 64 has a recess 69 extending into an interior surface 71 of the perimeter wall 64 which is aligned with and is coextensive with the protrusion 67 on the exterior surface 69. The protrusion 67 on the exterior surface 69 is positioned in the channel 45 in the angled bounding surface 44 of the depression 40 when the cup 58 is positioned in the depression 40 for releasably retaining the cup 58 in the depression 40. Additionally, an outwardly facing surface 73 of the protrusion 67 is structured to conform to the plurality of intersecting surfaces 47 of the channel 45 to secure the cup 58 in the depression 40. The protrusion 67 on the exterior surface 69 is comprised of a resiliently compressible material, including but not being limited to rubber or silicone, thereby enabling the protrusion 67 on the exterior surface 69 to compress for removing the protrusion 67 on the exterior surface 69 from the channel 45.

A cap 72 is positionable on top of the cup 58 when the cup 58 is placed in the cup portion 20 of the electronic device grip 12 to retain the charm 60 in the cup 58. The cap 72 releasably engages the cup portion 20 of the electronic device grip 12 thereby releasably attaching the cap 72 and the cup 58 to the cup portion 20. The cap 72 has a lens 74 that is integrated into the cap 72 and the lens 74 is comprised of a translucent material to pass light through the lens 74 thereby enabling the charm 60 to be visible through the lens 74. The cap 72 is continuously arcuate such that the cap 72 defines an annular ring and the cap 72 has an inwardly facing surface 76 and an outwardly facing surface 78.

The cap 72 has a ledge 80 extending laterally away from the outwardly facing surface 78 and the ledge 80 has a lower surface 82 which is perpendicularly oriented with the outwardly facing surface 78. The ledge 80 has an exterior surface 84 that is perpendicularly oriented with the lower surface 82 of the ledge 80 and the ledge 80 has an upper surface 86 which extends between the exterior surface 84 of the ledge 80 and the inwardly facing surface 76 of the cap 72. The upper surface 86 has a sloped portion 88 and a planar portion 90 and the sloped portion 88 slopes upwardly between the exterior surface 84 of the ledge 80 and the planar portion 90. The planar portion 90 intersects the inwardly facing surface 76 of the cap 72 and is perpendicularly oriented with the inwardly facing surface 76.

The outwardly facing surface 78 of the cap 72 is threaded thereby enabling the outwardly facing surface 78 to threadably engage the vertical bounding surface 48 of the depression 40 in the cup portion 20 of the electronic device grip 12. A lowermost surface 92 of the cap 72 rests upon the lip 66 on the perimeter wall 64 of the cup 58 thereby retaining each of the cap 72 and the cup 58 on the cup portion 20 of the electronic device grip 12. The lower surface 82 of the ledge 80 rests upon the top end 32 of the cup portion 20 of the electronic device grip 12 having the exterior surface 84 of the ledge 80 being aligned with an outermost surface 94 of the lip 36 on the outer wall 30 of the cup portion 20.

The inwardly facing surface 76 has a groove 96 which extends toward the outwardly facing surface 78 and the groove 96 extends around a full circumference of the inwardly facing surface 76. The lens 74 extends into the groove 96 thereby retaining the lens 74 in the cap 72 having the lens 74 lying on a plane that is oriented parallel to the bottom wall 62 of the cup 58 when the cap 72 is attached to the cup portion 20 of the electronic device grip 12. A plurality of gems 98 is provided and each of the plurality of gems 98 is attached to the sloped portion 88 of the ledge 80 of the cap 72 to enhance the ornamental appearance of the cap 72. The gems 98 are evenly spaced apart from each other and are distributed around a full circumference of the sloped portion 88 of the ledge 80.

In use, the protective sheet 56 is removed from the adhesive layer 50 and the adhesive layer 50 is adhered to the back wall 54 of the personal electronic device 16. The cup 58 is placed in the cup portion 20 of the electronic device grip 12 and the charm 60 is placed in the cup 58 and the cap 72 is attached to the cup portion 20 of the electronic device grip 12. In this way the charm 60 is visible through the lens 74 of the cap 72 and the electronic device grip 12 facilitates the user 18 to manipulate the personal electronic device 16 by gripping the electronic device grip 12. The cap 72 can be removed from the cup portion 20 at any time to either remove or replace the charm 60.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A charm holder grip device which is mountable to a personal electronic device for holding the personal electronic device while also containing and displaying a charm of sentimental value, said device comprising:

an electronic device grip having an attachment element which engages a personal electronic device thereby enabling said electronic device grip to be retained on said personal electronic device wherein said electronic device grip is configured to be gripped by a user for holding said personal electronic device, said electronic device grip having a cup portion which tapers with respect to said attachment element wherein said cup portion is configured to facilitate a user to grip said cup portion thereby enabling the user to hold said personal electronic device;

a cup being releasably attachable to said cup portion of said electronic device grip wherein said cup is configured to contain a charm having sentimental value to the user; and a cap being positionable on top of said cup when said cup is placed in said cup portion of said electronic device grip wherein said cap is configured to retain the charm in said cup, said cap releasably engaging said cup portion thereby releasably attaching said cap and said cup to said cup portion, said cap having a lens being integrated into said cap, said lens being comprised of a translucent material wherein said lens is configured to pass light through said lens thereby enabling the charm to be visible through said lens.

2. The device according to claim 1, wherein:

said electronic device grip has a disk portion which has a bottom surface and a top surface;

said top surface slopes upwardly with respect to said bottom surface toward a center of said disk portion;

said cup portion has a bottom end which is attached to said top surface of said disk portion at said center of said disk portion;

said cup portion has an outer wall angling outwardly between said bottom end and a top end of said cup portion wherein said outer wall is configured to enable the user to grip said outer wall with their fingers;

said outer wall has a lip extending laterally away from an outer surface of said outer wall;

said lip is aligned with said top end wherein said lip is configured to inhibit the user's fingers from sliding upwardly off of said outer wall;

said lip extends around a full circumference of said outer wall;

said cup portion has a depression extending downwardly into said top end;

said depression has a lower bounding surface and an angled bounding surface extending upwardly from and sloping outwardly from said lower bounding surface;

said depression has an upper bounding surface being oriented perpendicular to said angled bounding surface;

said depression has a vertical bounding surface extending between said upper bounding surface and said top end of said cup portion;

said vertical bounding surface being perpendicularly oriented with said upper bounding surface;

said lower bounding surface lies on a plane that is oriented parallel to said bottom surface of said disk portion;

said upper bounding surface lies on a plane being oriented parallel to said lower bounding surface; and said vertical bounding surface is threaded.

3. The device according to claim 2, wherein:

said depression has a channel which extends into said angled bounding surface of said depression and said channel extends around a full circumference of said angled bounding surface;

said channel is located between said vertical bounding surface and said lower bounding surface;
said channel has a plurality of intersecting surfaces which are oriented at obtuse angles with each other such that said channel has a rectilinear profile;
said outer wall of said of cup portion has a protrusion which extends outwardly from said outer surface of said outer wall; and
said protrusion is aligned with and is coextensive with said channel in said angled bounding surface of said depression.

4. The device according to claim 3, wherein:
said cup has a bottom wall and a perimeter wall extending upwardly from and angling outwardly from said bottom wall;
said cup has a lip which extends laterally away from an exterior surface of said perimeter wall;
said lip on said perimeter wall extends around a full circumference of said perimeter wall;
said lip on said perimeter wall is aligned with a top edge of said perimeter wall;
said top edge defines an opening into said cup;
said bottom wall lies upon said lower bounding surface of said depression when said cup is placed into said cup portion;
said perimeter wall rests against said angled bounding surface of said depression when said cup is placed into said cup portion;
said lip on said perimeter wall lies upon said upper bounding surface of said depression when said cup is placed into said cup portion;
said perimeter wall of said cup has a protrusion which extends outwardly from exterior surface of said perimeter wall;
said perimeter wall has a recess extending into an interior surface of said perimeter wall;
said recess is aligned with and is coextensive with said protrusion on said exterior surface;
said protrusion on said exterior surface is positioned in said channel in said angled bounding surface of said depression when said cup being positioned in said depression for releasably retaining said cup in said depression; and
an outwardly facing surface of said protrusion is structured to conform to said plurality of intersecting surfaces of said channel to secure said cup in said depression.

5. The device according to claim 2, wherein:
said cap is continuously arcuate such that said cap defines an annular ring;
said cap has an inwardly facing surface and an outwardly facing surface;
said cap has a ledge extending laterally away from said outwardly facing surface;
said ledge has a lower surface which is perpendicularly oriented with said outwardly facing surface;
said ledge has an exterior surface which is perpendicularly oriented with said lower surface of said ledge;
said ledge has an upper surface which extends between said exterior surface of said ledge and said inwardly facing surface of said cap;
said upper surface has a sloped portion and a planar portion;
said sloped portion slopes upwardly between said exterior surface of said ledge and said planar portion;
said planar portion intersects said inwardly facing surface of said cap and is perpendicularly oriented with said inwardly facing surface;
said outwardly facing surface of said cap is threaded thereby enabling said outwardly facing surface to threadably engage said vertical bounding surface of said depression in said cup portion of said electronic device grip having said lowermost surface of said cap resting upon said lip on said perimeter wall of said cup thereby retaining each of said cap and said cup on said cup portion of said electronic device grip; and
said lower surface of said ledge rests upon said top end of said cup portion of said electronic device grip having said exterior surface of said ledge being aligned with an outermost surface of said lip on said outer wall of said cup portion.

6. The device according to claim 5, wherein:
said inwardly facing surface has a groove which extends toward said outwardly facing surface;
said groove extends around a full circumference of said inwardly facing surface; and
said lens extends into said groove thereby retaining said lens in said cap having said lens lying on a plane being oriented parallel to said bottom wall of said cup when said cap is attached to said cup portion of said electronic device grip.

7. The device according to claim 5, wherein:
said device includes a plurality of gems;
each of said plurality of gems is attached to said sloped portion of said ledge of said cap wherein said plurality of gems is configured to enhance the ornamental appearance of said cap; and
said plurality of gems is evenly spaced apart from each other and is distributed around a full circumference of said sloped portion of said ledge.

8. The device according to claim 1, wherein:
said electronic device grip has a disk portion which has a bottom surface;
said device includes an adhesive layer being bonded to said bottom surface of said disk portion having said adhesive layer completely covering said bottom surface;
said adhesive layer defines said attachment element of said electronic device grip; and
said adhesive layer has an exposed surface with respect to said bottom surface of said disk portion which adhesively engages a back wall of said personal electronic device thereby retaining said electronic device grip on said back wall of said personal electronic device.

9. The device according to claim 8, wherein:
said device includes a protective sheet being removably applied to said exposed surface of said adhesive layer having said protective sheet completely covering said adhesive layer thereby inhibiting said adhesive layer from being adhered;
said protective sheet being removable from said exposed surface of said adhesive layer prior to adhering said adhesive layer to said back wall of said personal electronic device.

10. A charm holder grip device which is mountable to a personal electronic device for holding the personal electronic device while also containing and displaying a charm of sentimental value, said device comprising:
an electronic device grip having an attachment element which engages a personal electronic device thereby enabling said electronic device grip to be retained on said personal electronic device wherein said electronic device grip is configured to be gripped by a user for holding said personal electronic device, said electronic device grip having a cup portion which tapers with respect to said attachment element wherein said cup portion is configured to facilitate a user to grip said cup portion thereby enabling the user to hold said personal electronic device, said electronic device grip having a disk portion which has a bottom surface and a top surface, said top surface sloping upwardly with respect to said bottom surface toward a center of said disk portion, said cup portion having a bottom end being attached to said top surface of said disk portion at said center of said disk portion, said cup portion having an outer wall angling outwardly between said bottom end and a top end of said cup portion wherein said outer wall is configured to enable the user to grip said outer wall with their fingers, said outer wall having a lip extending laterally away from an outer surface of said outer wall, said lip being aligned with said top end wherein said lip is configured to inhibit the user's fingers from sliding upwardly off of said outer wall, said lip extending around a full circumference of said outer wall, said cup portion having a depression extending downwardly into said top end, said depression having a lower bounding surface and an angled bounding surface extending upwardly from and sloping outwardly from said lower bounding surface, said depression having an upper bounding surface being oriented perpendicular to said angled bounding surface, said depression having a vertical bounding surface extending between said upper bounding surface and said top end of said cup portion, said vertical bounding surface being perpendicularly oriented with said upper bounding surface, said lower bounding surface lying on a plane being oriented parallel to said bottom surface of said disk portion, said upper bounding surface lying on a plane being oriented parallel to said lower bounding surface, said vertical bounding surface being threaded, said depression having a channel which extends into said angled bounding surface of said depression and said channel extends around a full circumference of said angled bounding surface, said channel being located between said vertical bounding surface and said lower bounding surface, said channel having a plurality of intersecting surfaces which are oriented at obtuse angles with each other such that said channel has a rectilinear profile, said outer wall of said of cup portion having a protrusion which extends outwardly from said outer surface of said outer wall, said protrusion being aligned with and being coextensive with said channel in said angled bounding surface of said depression;

an adhesive layer being bonded to said bottom surface of said disk portion having said adhesive layer completely covering said bottom surface, said adhesive layer defining said attachment element of said electronic device grip, said adhesive layer having an exposed surface with respect to said bottom surface of said disk portion which adhesively engages a back wall of said personal electronic device thereby retaining said electronic device grip on said back wall of said personal electronic device;

a protective sheet being removably applied to said exposed surface of said adhesive layer having said protective sheet completely covering said adhesive layer thereby inhibiting said adhesive layer from being adhered, said protective sheet being removable from said exposed surface of said adhesive layer prior to adhering said adhesive layer to said back wall of said personal electronic device;

a cup being releasably attachable to said cup portion of said electronic device grip wherein said cup is configured to contain a charm having sentimental value to the user, said cup having a bottom wall and a perimeter wall extending upwardly from and angling outwardly from said bottom wall, said cup having a lip which extends laterally away from an exterior surface of said perimeter wall, said lip on said perimeter wall extending around a full circumference of said perimeter wall, said lip on said perimeter wall being aligned with a top edge of said perimeter wall, said top edge defining an opening into said cup, said bottom wall lying upon said lower bounding surface of said depression when said cup is placed into said cup portion, said perimeter wall resting against said angled bounding surface of said depression when said cup is placed into said cup portion, said lip on said perimeter wall lying upon said upper bounding surface of said depression when said cup is placed into said cup portion, said perimeter wall of said cup having a protrusion which extends outwardly from exterior surface of said perimeter wall, said perimeter wall having a recess extending into an interior surface of said perimeter wall, said recess which being aligned with and being coextensive with said protrusion on said exterior surface, said protrusion on said exterior surface being positioned in said channel in said angled bounding surface of said depression when said cup is positioned in said depression for releasably retaining said cup in said depression, an outwardly facing surface of said protrusion being structured to conform to said plurality of intersecting surfaces of said channel to secure said cup in said depression;

a cap being positionable on top of said cup when said cup is placed in said cup portion of said electronic device grip wherein said cap is configured to retain the charm in said cup, said cap releasably engaging said cup portion thereby releasably attaching said cap and said cup to said cup portion, said cap having a lens being integrated into said cap, said lens being comprised of a translucent material wherein said lens is configured to pass light through said lens thereby enabling the charm to be visible through said lens, said cap being continuously arcuate such that said cap defines an annular ring, said cap having an inwardly facing surface and an outwardly facing surface, said cap having a ledge extending laterally away from said outwardly facing surface, said ledge having a lower surface being perpendicularly oriented with said outwardly facing surface, said ledge having an exterior surface being perpendicularly oriented with said lower surface of said ledge, said ledge having an upper surface which extends between said exterior surface of said ledge and said inwardly facing surface of said cap, said upper surface having a sloped portion and a planar portion, said sloped portion sloping upwardly between said exterior surface of said ledge and said planar portion, said planar portion intersecting said inwardly facing surface of said cap and being perpendicularly oriented with said inwardly facing surface, said outwardly facing surface of said cap being threaded thereby enabling said outwardly facing surface to threadably engage said vertical bounding surface of said depression in said cup portion of said electronic device grip having said lowermost surface of said cap resting upon said lip on said perimeter wall of said cup thereby retaining each of said cap and said cup on said cup portion of said electronic device grip, said lower surface of said ledge resting upon said top end of said cup portion of said electronic device grip having said exterior surface of said ledge being aligned with an outermost surface of said lip on said outer wall of said cup portion, said inwardly facing surface having a groove which extends toward said outwardly facing surface, said groove extending around a full circumference of said inwardly facing surface, said lens extending into said groove thereby retaining said lens in said cap having said lens lying on a plane being oriented parallel to said bottom wall of said cup when said cap is attached to said cup portion of said electronic device grip; and a plurality of gems, each of said plurality of gems being attached to said sloped portion of said ledge of said cap wherein said plurality of gems is configured to enhance the ornamental appearance of said cap, said plurality of gems being evenly spaced apart from each other and being distributed around a full circumference of said sloped portion of said ledge.

* * * * *